(12) United States Patent
Endo (10) Patent No.: US 7,483,627 B2
(45) Date of Patent: Jan. 27, 2009

(54) IMAGE-TAKING APPARATUS (75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 394 days.

(21) Appl. No.: 11/253,717

(22) Filed: Oct. 20, 2005

(65) Prior Publication Data
US 2006/0083507 A1    Apr. 20, 2006

(30) Foreign Application Priority Data
Oct. 20, 2004   (JP)   ............................. 2004-305557

(51) Int. Cl.
G03B 15/02   (2006.01)

(52) U.S. Cl. .................. 396/61; 396/106; 396/182; 348/370

(58) Field of Classification Search .................. 396/61, 396/80, 182, 88, 156, 159; 348/370
See application file for complete search history.

(56) References Cited

U.S. PATENT DOCUMENTS

| | | | | |
|---|---|---|---|---|
| 5,231,446 A | * | 7/1993 | Ohtsuka | 396/59 |
| 5,570,148 A | * | 10/1996 | Hibino et al. | 396/182 |
| 5,822,624 A | * | 10/1998 | Fukuhara et al. | 396/61 |
| 5,895,128 A | * | 4/1999 | Kishimoto et al. | 396/61 |
| 6,079,834 A | * | 6/2000 | McCoy | 353/110 |
| 6,349,175 B1 | * | 2/2002 | Tokunaga | 396/157 |
| 6,856,765 B2 | * | 2/2005 | Okubo | 396/88 |
| 6,952,525 B2 | * | 10/2005 | Lee et al. | 396/61 |
| 7,221,864 B2 | * | 5/2007 | Seo | 396/176 |
| 2005/0265014 A1 | * | 12/2005 | Matsui et al. | 362/5 |
| 2006/0087253 A1 | * | 4/2006 | Chen | 315/241 P |

FOREIGN PATENT DOCUMENTS

| | | |
|---|---|---|
| JP | 9-90480 A | 4/1997 |
| JP | 2003-179808 A | 6/2003 |

OTHER PUBLICATIONS

Wu et al. (Linear Technology Corp), "Simple circuitry for cellular-telephone/camera-flash illumination", May 27, 2004, Electronics Design Strategy, News, pp. 77-86.*

* cited by examiner

Primary Examiner—Christopher E Mahoney
Assistant Examiner—Linda B Smith
(74) Attorney, Agent, or Firm—Sughrue Mion, PLLC (57) ABSTRACT

The present invention provides an image-taking apparatus which includes: a first light-emitting section having a xenon tube and a main capacitor; and a second light-emitting section having an LED. When an image is to be taken with an auxiliary light emission immediately after power-on and immediately after previous image taking with a previous auxiliary light emission, recharge of the main capacitor is not completed yet. In such a case, the image-taking apparatus selects the second light-emitting section to emit auxiliary light from the LED.

2 Claims, 8 Drawing Sheets

IMAGE-TAKING APPARATUS

BACKGROUND OF THE INVENTION

1. Field of the Invention

The present invention relates to an image-taking apparatus that generates image signals by forming a subject image on an imaging device through an image-taking optical system.

2. Description of the Related Art

There has been proposed an image-taking apparatus employing both a halogen lamp and a xenon tube as a source for auxiliary light (see Japanese Patent Application Publication No. 9-90480 for example).

In contrast, portable telephones equipped with a camera employ a power-thrifty LED as an auxiliary light source in recent years. Since the amount of light from such an LED is easy to control when compared to a xenon tube, techniques for controlling the amount of power emitted from an LED have been proposed and disclosed (see Japanese Patent Application Publication No. 2003-179808 for example).

However, the light emission power of LEDs is extremely small when compared to conventional xenon tubes. Therefore, if a light-emitting unit employing an LED is incorporated in a camera, auxiliary light for image taking cannot reach a subject located far away from the camera, which is a problem. Even if auxiliary light for image-taking emitted to a subject reaches the subject, the amount of such auxiliary light may not be enough, which leads to a shortage of the required amount of light. Nevertheless, if such an LED is used as a light source, recharge time required by a xenon tube can be saved, a light-emitting unit that quickly emits light can be realized, and an amount of light emitted within close range can be controlled which has been difficult in a xenon tube. For these reasons, it is absolutely desirable to employ an LED.

SUMMARY OF THE INVENTION

The present invention has been made in view of the above circumstances, and provides an image-taking apparatus that has a light-emitting section capable of emitting an appropriate amount of light to a close subject, quickly emitting light, and saving power.

A first image-taking apparatus according to the present invention is an apparatus which generates image signals by forming a subject image on an imaging device through an image-taking optical system, the apparatus including:

a first light-emitting section which has a xenon tube and a main capacitor, and accumulates charge in the main capacitor so as to emit auxiliary light to a subject when an image is taken;

a second light-emitting section which has an LED and emits auxiliary light to a subject when an image is taken;

a full-charge sensor which detects whether recharge of the main capacitor is completed or not; and a light-emission controlling section which causes the second light-emitting section to emit light when an image is taken with an auxiliary light emission in a state where recharge of the main capacitor is incomplete.

According to the first image-taking apparatus, auxiliary light is emitted from the LED of the second light-emitting section under control of the light-emission controlling section in a state where recharge of the main capacitor is not completed. With this configuration, when a user wants to take an image immediately after the image-taking apparatus is turned on or immediately after image taking with auxiliary light by the xenon tube takes place, light can be emitted from the LED of the second light-emitting section even in a state where recharge of the main capacitor is not completed. The LED requires no recharge unlike the xenon tube and emits an amount of light easy to control. Therefore, according to the above image-taking apparatus, if a user wants to take an image immediately after the image-taking apparatus is turned on or immediately after image taking with auxiliary light by the xenon tube takes place, a preferable amount of light can be instantly emitted as long as a subject is within a reachable range.

By including the second light-emitting section having the LED in addition to the xenon tube in this way, it is possible to realize an image-taking apparatus capable of emitting an appropriate amount of light to a subject and having a light-emitting section that quickly emits light.

A second image-taking apparatus according to the present invention is an apparatus which generates image signals by forming a subject image on an imaging device through an image-taking optical system, the apparatus including:

a first light-emitting section which has a xenon tube and emits auxiliary light to a subject when an image is taken;

a second light-emitting section which has an LED and emits auxiliary light to a subject when an image is taken;

a distance measuring section which measures a distance to subject; and a light-emission controlling section which causes the second light-emitting section to emit light when a distance to subject is shorter than a predetermined distance and which causes the first light-emitting section to emit light when a distance to subject is equal to or longer than the predetermined distance, when an image is taken with an auxiliary light emission.

According to the second image-taking apparatus, if the light-emission controlling section determines that a distance to subject measured by the distance measuring section is shorter than a predetermined distance and that the distance is short enough to allow auxiliary light emitted by power of the LED of the second light-emitting section to reach a subject, light is emitted from the second light-emitting section. In contrast, if the light-emission controlling section determines that a distance to subject measured by the distance measuring section is equal to or longer than the predetermined distance and that the distance is not short enough to allow auxiliary light emitted by power of the LED of the second light-emitting section to reach a subject, light is emitted from the first light-emitting section.

With this configuration, the first and second light-emitting sections can be selectively used depending on the distance to subject, and power can be saved more than conventional apparatus because the second light-emitting section instead of the first light-emitting section can emit light.

In this way, it is possible to realize an image-taking apparatus which is power-thrifty and which has a light emitting section emitting an appropriate amount of light even in a short distance.

A third image-taking apparatus according to the present invention is an apparatus which generates image signals by forming a subject image on an imaging device through an image-taking optical system, the apparatus including:

a first light-emitting section which has a xenon tube and a main capacitor, and accumulates charge in the main capacitor so as to emit auxiliary light to a subject when an image is taken;

a second light-emitting section which has an LED and emits auxiliary light to a subject when an image is taken;

a full-charge sensor which detects whether recharge of the main capacitor is completed or not;

a distance measuring section which measures a distance to subject; and a light-emission controlling section which causes the second light-emitting section to emit light when a distance to subject is shorter than a predetermined distance and recharge of the main capacitor is incomplete, and which causes the first light-emitting section to emit light when a distance to subject is equal to or longer than the predetermined distance and recharge of the main capacitor is completed, when an image is taken with an auxiliary light emission.

According to the third image-taking apparatus, if the light-emission controlling section determines that recharge of the main capacitor is not completed and a distance to subject measured by the distance measuring section is shorter than a predetermined distance, light is emitted from the second light-emitting section. In contrast, if the light-emission controlling section determines that recharge of the main capacitor is completed and a distance to subject measured by the distance measuring section is equal to or longer than the predetermined distance, light is emitted from the first light-emitting section.

With this configuration, it is possible to take an image with an appropriate amount of auxiliary light according to the distance to subject.

A fourth image-taking apparatus according to the present invention is an apparatus which generates image signals by forming a subject image on an imaging device through an image-taking optical system, the apparatus including:

a first light-emitting section which has a xenon tube and emits auxiliary light to a subject when an image is taken;

a second light-emitting section which has an LED and emits auxiliary light to a subject when an image is taken;

a photometric measurement section which measures subject brightness; and a light-emission controlling section which causes the first light-emitting section to emit light when a subject brightness level is below a predetermined level and which causes the second light-emitting section to emit light when a subject brightness level is equal to or above the predetermined level, when an image is taken with an auxiliary light emission.

According to the fourth image-taking apparatus, if the light-emission controlling section determines that subject brightness measured by the photometric measurement section is below a predetermined level, light is emitted from the first light-emitting section. In contrast, if the light-emission controlling section determines that subject brightness measured by the photometric measurement section is equal to or above the predetermined level, light is emitted from the second light-emitting section.

With this configuration, auxiliary light is emitted from the first light-emitting section according to the brightness level when the light-emission controlling section determines that subject brightness is below a predetermined level as usual, whereas auxiliary light is emitted from the LED of the second light-emitting section when the light-emission controlling section determines that subject brightness is equal to or above the predetermined level.

As described above, the amount of light emitted from the LED of the second light-emitting section can be controlled. Therefore, it is possible to make effective use of the second light-emitting section to obtain appropriate exposure according to the brightness level.

Preferably, the fourth image-taking apparatus, further including a distance including section which measures a distance to subject, wherein the light-emission controlling section causes the second light-emitting section to emit light when exposure by the second light-emitting section is sufficient and which causes the first light-emitting section to emit light when exposure by the second light-emitting section is insufficient, based on subject brightness and distance to subject, when an image is taken with an auxiliary light emission.

By selectively using the first and second light-emitting sections in this way, it is possible to realize a light-emitting section that can emit an appropriate amount of auxiliary light to both a distant subject and a close subject.

Accordingly, by use of the LED, it is possible to achieve a light-emitting section that is responsive and power-thrifty and that can emit an appropriate amount of auxiliary light to a close subject.

A fifth image-taking apparatus according to the present invention is an apparatus which generates image signals by forming a subject image on an imaging device through an image-taking optical system, the apparatus including:

a first light-emitting section which has a xenon tube and emits auxiliary light to a subject when an image is taken;

a second light-emitting section which has an LED and emits auxiliary light to a subject when an image is taken;

a photometric measurement section which measures subject brightness;

a sensitivity setting section which sets sensitivity for image taking; and a light-emission controlling section which causes the second light-emitting section to emit light when exposure by the second light-emitting section is sufficient and which causes the first light-emitting section to emit light when exposure by the second light-emitting section is insufficient, based on subject brightness and sensitivity for image taking, when an image is taken with an auxiliary light emission.

According to the fifth image-taking apparatus, the light-emission controlling section causes either one of the first and second light-emitting sections as required based on the subject brightness and sensitivity for image taking set by the sensitivity setting section.

When auxiliary light can be emitted from either one of the first and second light-emitting sections as required based on the subject brightness and sensitivity for image taking in this way, it is possible to realize an image-taking apparatus that obtains appropriate exposure by controlling an amount of auxiliary light according to a dynamic range determined based on the brightness and sensitivity.

A sixth image-taking apparatus according to the present invention is an apparatus which generates image signals by forming a subject image on an imaging device through an image-taking optical system, the apparatus including:

a first light-emitting section which has a xenon tube and emits auxiliary light to a subject when an image is taken;

a second light-emitting section which has an LED and emits auxiliary light to a subject when an image is taken;

a photometric measurement section which measures subject brightness;

a sensitivity setting section which is capable of automatically setting sensitivity for image taking; and a light-emission controlling section which causes the second light-emitting section to emit light when exposure by the second light-emitting section is sufficient and which causes the first light-emitting section to emit light when exposure by the second light-emitting section is insufficient, based on subject brightness and automatically settable sensitivity, when an image is taken with an auxiliary light emission.

According to the sixth image-taking apparatus, the light-emission controlling section automatically sets a sensitivity level considering the result of photometric measurement so that auxiliary light is emitted from either one of the first and second light-emitting sections to obtain appropriate exposure when an image is taken.

With this configuration, the first and second light-emitting sections can be selectively used according to a capability such as automatic increase of sensitivity in the image-taking apparatus.

As described above, according to the present invention, it is possible to realize an image-taking apparatus that is responsive and power-thrifty and that can emit an appropriate amount of light to a close subject by using the LED.

DETAILED DESCRIPTION OF THE INVENTION

In the following, embodiments of the present invention will be described with reference to the drawings.

Figure 1:
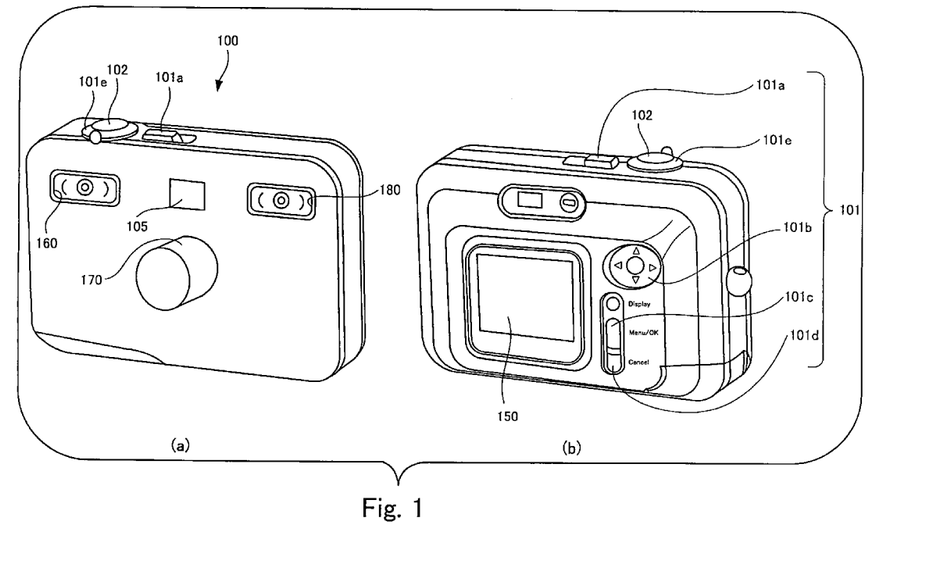
FIG. 1 is a diagram showing a digital camera according to a first embodiment of the image-taking apparatus of the present invention.

FIG. 1 shows a digital camera according to a first embodiment of the image-taking apparatus of the present invention.

FIG. 1 is a perspective view of the digital camera according to the first embodiment of the present invention. Parts (a) and (b) of FIG. 1 show the front and the back of the digital camera as viewed from above, respectively.

As shown in Part (a) of FIG. 1, a digital camera 100 of the present embodiment has a lens barrel 170. The digital camera 100 is so configured as to guide a subject image through an image-taking lens incorporated in the lens barrel 170 and to form the image on a CCD solid-state imaging device disposed inside the digital camera 100. Also, the digital camera 100 is so configured as to generate image signals representing a through image and a taken image by means of the CCD solid-state imaging device which will be described later and to detect a distance to subject and subject brightness by performing TTL distance measurement and TTL metering based on the generated image signals.

Further, the digital camera 100 is so configured as to emit auxiliary light from an LED through an auxiliary-light emitting window 160 or from a xenon tube through an auxiliary-light emitting window 180 disposed inside the digital camera 100 to a subject depending on the detected subject brightness.

In addition, as shown in Part (b) of FIG. 1, the digital camera 100 of the present embodiment has an operating switch group 101 disposed on the back and top. A user makes various operations through the operating switch group 101 when using the digital camera 100.

The operating switch group 101 includes a power switch 101a for activating the digital camera 100, a cross key 101b, a menu/OK key 101c, a cancel key 101d, a mode lever 101e, and the like. The mode lever 101e is used for switching between a playback mode and an image-taking mode and for switching between a moving-image mode and a still-image mode in the image-taking mode. When a user selects the image-taking mode by using the mode lever 101e, a through image is displayed. In this state, the user can take an image of a subject upon pressing a release button 102 while looking at the displayed through image. When the user selects the playback mode by using the mode lever 101e, a taken image is played back and displayed on a LCD panel 150. Further, the user can select a sensitivity-setting item from items in a selection menu by pressing the menu/OK key 101c so that he/she can manually set a sensitivity level such as ISO 100, ISO 200, ISO 400, and so on. When a sensitivity level is manually set in this way, the contents of such sensitivity setting is read by a main CPU (described later) provided inside the digital camera 100 and sensitivity is adjusted by performing pixel mixing and the like based on a processing procedure described in a program stored in a EEPROM (described later). In addition to such manual setting, automatic sensitivity setting is also selectable. A user can select an item indicating automatic sensitivity setting to automatically set a sensitivity value in the digital camera.

In the digital camera 100, an autofocus function using TTL distance measurement is activated upon power-on so that the focus is automatically adjusted and a subject in focus is displayed on a display screen as a through image.

When the release button 102 is pressed while the through image is displayed, an instruction for starting image taking is given to the internal sections of the digital camera 100 to start image-taking processing.

The release button 102 is used to give instructions for starting image taking and has two operation modes: full press and half press. When the release button 102 is half pressed, TTL metering and TTL distance measurements are both performed in the digital camera 100. Then, an aperture is set according to a photometric value and a focus lens is arranged at an in-focus position matching a measured distance to subject. Subsequently, when the release button 102 is fully pressed, an electronic shutter is set in the CCD solid-state imaging device and exposure is performed. When it is determined that the subject brightness is low as a result of the TTL metering, auxiliary light is emitted through either the auxiliary-light emitting window 160 or the auxiliary-light emitting window 180 and image taking is performed.

As mentioned above, the digital camera 100 of the present embodiment is equipped with two light-emitting sections. The first light-emitting section includes a xenon tube and a main capacitor whereas the second light-emitting section includes an LED.

In such a digital camera, it takes a certain period of time after power-on to complete recharge of the main capacitor. Therefore, the digital camera of the present embodiment is so configured as to emit auxiliary light from the second light-emitting section having the LED when taking an image requiring auxiliary light in a state where recharge of the main capacitor is not completed yet.

Figure 2:
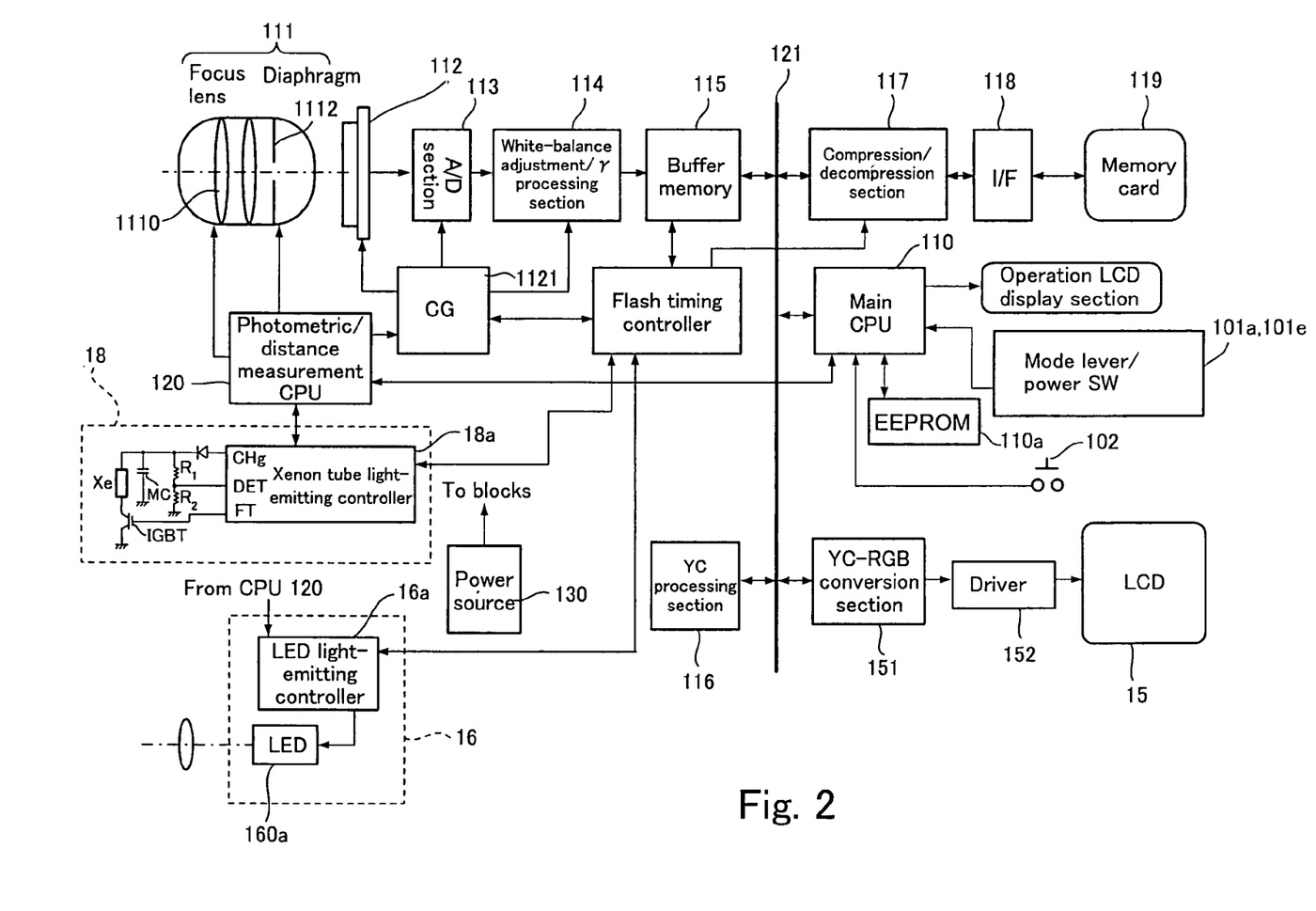
FIG. 2 is a functional block diagram of the digital camera shown in FIG. 1.

FIG. 2 is a functional block diagram of the digital camera 100 shown in FIG. 1.

The configuration of the digital camera 100 will be described with reference to FIG. 2 in terms of signal processing.

The digital camera 100 of the present embodiment includes a main CPU 110 that controls all processing in the digital camera 100. The main CPU 110 receives operation signals from the various switches of the operating switch group 101 shown in Part (b) of FIG. 1. The main CPU 110 includes an EEPROM 110a which stores programs necessary for the operation of the digital camera 100. When the power switch 101a of the digital camera having such a configuration is pressed, the main CPU 110 starts controlling all the operation of the digital camera 100 according to procedures described in the programs stored in the EEPROM 110a.

First, the flow of image signals will be described with reference to FIG. 2.

When the power switch 101a is pressed, the main CPU 110 detects the power switch 101a being pressed and a power source 130 supplies power to blocks such as the main CPU 110, a photometric/distance measurement CPU 120, and the like. If the image-taking mode is selected by the mode lever 101e at the time of turning-on of the power source 130, image signals representing a subject image formed on a CCD solid-state imaging device 112 are thinned out and output at predetermined intervals so that the subject image represented by the output image signals is displayed on the LCD panel 150 of an LCD 15. The CCD solid-state imaging device 112 receives timing signals from a clock generator (hereinafter referred to as "CG") 1121. Image signals are thinned out and output at predetermined intervals in synchronization with such timing signals. The CG 1121 outputs timing signals under instructions from the main CPU 110. Such timing signals are also sent to, in addition to the CCD solid-state imaging device 112, an A/D section 113 and a white-balance adjustment/γ processing section 114 which are provided in subsequent stages. Accordingly, image signals are sequentially processed in synchronization with the timing signals in the CCD solid-state imaging device 112, the A/D section 113, and the white-balance adjustment/γ processing section 114.

Under instructions from the main CPU 110, image signals are converted into digital image signals in the A/D section 113 and subjected to white-balance adjustment and γ correction in the white-balance adjustment/γ processing section 114 at predetermined intervals in synchronization with timing signals output from the CG 1121. The flow of image signals needs to be smooth during processing. Therefore, a buffer memory 115 is provided in a subsequent stage, which adjusts timings for transferring image signals to an YC processing section 116 at predetermined intervals. From the buffer memory 115, image signals stored earlier are transferred first to the YC processing section 116 where the image signals are subjected to RGB-YC signal conversion to be converted into YC signals. The YC signals are then sent to the LCD 15 side via a bus 121. Prior to the LCD 15, there is provided an YC-RGB conversion section 151 where the received YC signals are again converted into RGB signals which are then sent to the LCD 15 via a driver 152. The LCD 15 displays an image of a subject on the LCD panel 150 based on the received RGB signals. In this way, image signals are kept being generated by the CCD solid-state imaging device 112 and processed by the A/D section 113 and the white-balance adjustment/γ processing section 114 in synchronization with timing signals output from the CG 1121. Therefore, an image of a subject to which the image-taking lens is directed is continuously displayed on the LCD panel 150 of the LCD 15. While looking at a continuously displayed subject image, a user presses the release button 102 when a photo opportunity comes. When the release button 102 is depressed, and only after a predetermined time has elapsed since such depression, all the image signals of a subject image formed on the CCD solid-state imaging device 112 are output as RGB signals. These RGB signals are converted into YC signals in the YC processing section 116 and the YC signals are compressed by a compression/decompression section 117. Then, the compressed signals are recorded in a memory card 119 via an I/F 118. In the compression/decompression section 117, signals of still images are compressed by a compression method in conformity with JPEG standards and stored in the memory card 119 as in form of contents in a file. The file stored in the memory card 119 has a header in which compression information and image-taking information are written. When the playback mode is selected by the mode lever 101e of the digital camera 100, the header of the file is read out from the memory card 119 first. Then, based on the compression information in the header read out, the compressed image signals in the file are decompressed to be restored to the original image signals. Subsequently, a subject image based on the restored original image signals is displayed on the LCD panel 150.

The digital camera 100 of the present embodiment is provided with the photometric/distance measurement CPU 120 for adjusting focus and exposure in addition to the main CPU 110. The photometric/distance measurement CPU 120 controls focus lens position of an image-taking optical system 111 and controls aperture changing. In addition, the photometric/distance measurement CPU 120 controls the operation of an LED light-emitting controller 16a and a xenon tube light-emitting controller 18a. When image taking requires an auxiliary light emission, the photometric/distance measurement CPU 120 controls either the LED light-emitting controller 16a or the xenon tube light-emitting controller 18a so that auxiliary light can be emitted from either an LED 160a or a xenon tube Xe. A white LED having about the same color temperature as a xenon tube is used as the LED 160a.

In focus adjustment, the photometric/distance measurement CPU 120 causes a focus lens 1110 to move to an in-focus position by driving it based on a distance-measurement value sent from the main CPU 110. In exposure adjustment, the photometric/distance measurement CPU 120 controls an amount of light to be applied to an image-taking surface of the CCD solid-state imaging device 112 by changing the size of the aperture of a diaphragm 1112 based on a photometric value sent from the main CPU 110. Depending on the photometric value, auxiliary light for image taking is necessary. Therefore, the photometric/distance measurement CPU 120 gives instructions to the LED light-emitting controller 16a or the xenon tube light-emitting controller 18a to emit light from the LED 160a or the xenon tube Xe. The xenon tube light-emitting controller 18a also serves to recharge a main capacitor MC shown in FIG. 2 and to monitor voltages generated in an electrode of the main capacitor MC while accumulating charge by such recharging. Resisters R1 and R2 perform such monitoring. These resisters R1 and R2 correspond to the "full-charge sensor" according to the present invention. The xenon tube light-emitting controller 18a, a transistor IGBT, and the main capacitor MC compose a first light-emitting section 18 which corresponds to the "first light-emitting section" according to the present invention. The LED light-emitting controller 16a and the LED 160a compose a second light-emitting section 16 which corresponds to the "second light-emitting section" according to the present invention.

The digital camera having the structure shown in FIG. 2 has two light-emitting sections: the first light-emitting section 18 and the second light-emitting section 16. When auxiliary light is necessary for image taking by the digital camera 100, auxiliary light is emitted either one of these two light-emitting sections and an image is taken.

How either one of the first light-emitting section 18 and the second light-emitting section 16 is selected at the time of image taking will be described below.

Upon depression of the release button 102, the main CPU 110 sends a photometric value at the time of half press of the release button 102 to the photometric/distance measurement CPU 120. Then, a sensor composed of the resistors R1 and R2 detects a voltage generated in an electrode of the main capacitor MC. When the photometric/distance measurement CPU 120 detects, via the xenon tube light-emitting controller 18a, a state where the detected voltage has reached a predetermined value and recharge is completed, the photometric/distance measurement CPU 120 provides the xenon tube light-emitting controller 18a with an instruction for causing the xenon tube Xe to emit auxiliary light according to the photometric value sent from the main CPU 110. Then, the xenon tube light-emitting controller 18a supplies a pulse signal to the transistor IGBT to switch the IGBT to ON state so that the charge accumulated in the main capacitor 110 can be released to the ground via the xenon tube Xe and the collector and emitter of the transistor IGBT.

In contrast, when the photometric/distance measurement CPU 120 detects, via the xenon tube light-emitting controller 18a, such a state that the detected voltage has not reached a predetermined value and recharge is not completed, the photometric/distance measurement CPU 120 provides the LED light-emitting controller 16a with an instruction for emitting auxiliary light according to the photometric value sent from the main CPU 110. In response to the instruction, the photometric/distance measurement CPU 120 causes the LED 160a to emit auxiliary light.

With this configuration, even immediately after power-on and immediately after the first light-emitting section (xenon tube side) 18 emits auxiliary light, it is possible to cause, in response to an image-taking operation, the LED 160a of the second light-emitting section 16 requiring no recharge of the main capacitor MC to instantly emit auxiliary light in a state where recharge of the main capacitor MC is incomplete.

Figure 3:
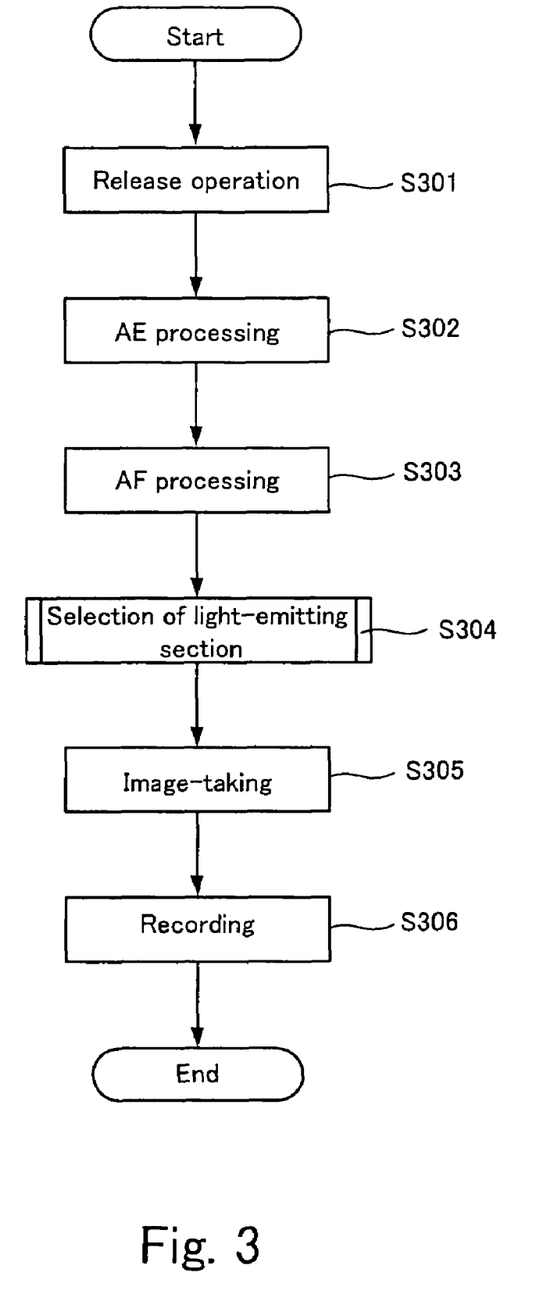
FIG. 3 is a flowchart showing a procedure of image taking performed by a main CPU.
Figure 4:
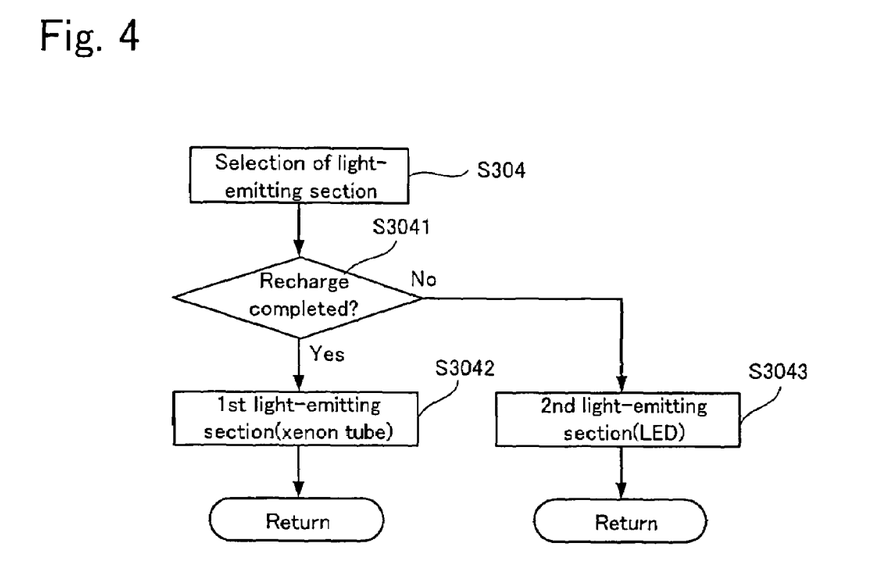
FIG. 4 is a flowchart showing a step of selecting a light-emitting section shown in FIG. 3 in detail.

FIG. 3 is a flowchart showing a procedure of image taking performed by the main CPU 110, and FIG. 4 is a flowchart showing a step of selecting light-emitting section shown in FIG. 3 in detail.

When the release button 102 is pressed and enters a half press state at step S301, the flow goes to step S302 where AE processing—i.e. TTL metering is performed. The result of the metering is sent to the photometric/distance measurement CPU 120 which changes the aperture of the diaphragm 112 according to the received result. Subsequently at step S303, AF processing—i.e. TTL distance measurement is performed in the following manner. First, the main CPU 110 instructs the photometric/distance measurement CPU 120 to move the focus lens 1110 along an optical axis. While the focus lens 1110 is being moved, the main CPU 110 determines contrast by sampling brightness. The main CPU 110 then informs the photometric/distance measurement CPU 120 of an in-focus position where the determined contrast is at the maximum so that the focus lens 1110 is moved to the in-focus position. If it is determined that auxiliary light is necessary for image taking based on the result of the TTL metering at step S302 and the result of the TTL distance measurement at step S303, the main CPU 110 causes the photometric/distance measurement CPU 120 to select either one of the first light-emitting section (xenon tube) 18 and the second light-emitting section (LED) 16 at step S304 so that auxiliary light is emitted from the selected light-emitting section. Then, image taking is performed in the following manner at step S305. When auxiliary light is emitted, the main CPU 110 causes the CG 1121 to supply an exposure starting signal to the CCD 112 via the photometric/distance measurement CPU 120 so as to start exposure. After a predetermined lapse of time from the start of the exposure, the main CPU 110 causes the CG 1121 to supply an exposure completing signal to the CCD 112. In response, the CCD 112 outputs image signals to the A/D section 113 that converts the received analog image signals into digital image signals. The digital image signals thus obtained is supplied to the white-balance adjustment/γ processing section 114 which applies image processing to the received image signals which are then output to the buffer 115. The image signals output to the buffer 115 are transferred to the YC processing section 116 at appropriate timing so that the YC processing section 116 applies image processing to the received image signals. The image signals are then supplied further to the compression/decompression section 117 which compresses the received image signals. Then, the flow goes to step S306 where the main CPU 110 causes the I/F 118 to record the image signals to the memory card 119, and the flow ends.

Now, step S304 of selecting a light-emitting section will be described in detail.

FIG. 4 is a flowchart showing the details of step S304.

Step 304 is a process performed by the main CPU 110. To be more specific, the main CPU 110 causes the photometric/distance measurement CPU 120 to select either one of the two light-emitting sections at step S304 by informing the photometric/distance measurement CPU 120 of a photometric value. Therefore, the flowchart in FIG. 4 will be described below as a flow of processes performed by the photometric/distance measurement CPU 120. The photometric/distance measurement CPU 120 corresponds to the "light-emission controlling section" according to the present invention.

At step S3041, the photometric/distance measurement CPU 120 determines if recharge of the main capacitor MC is completed or not via the xenon tube light-emitting controller 18a. If the recharge is completed (Yes) at step S3041, the flow goes to step S3042 where the photometric/distance measurement CPU 120 selects the first light-emitting section (xenon tube) 18 so that it causes the xenon tube Xe to emit auxiliary light for image taking at step S3042. If it is No at step S3041, the flow goes to step S3043 where the photometric/distance measurement CPU 120 selects the second light-emitting section (LED) 16 to emit auxiliary light for image taking from the LED 160a at step S3043.

In this way, if the LED 160a of the second light-emitting section 16 is caused to emit auxiliary light for image taking when the recharge is not completed, it is possible to realize a responsive digital camera that allows an LED requiring no recharge to instantly emit auxiliary light for image taking in response to an image-taking operation.

Figure 5:
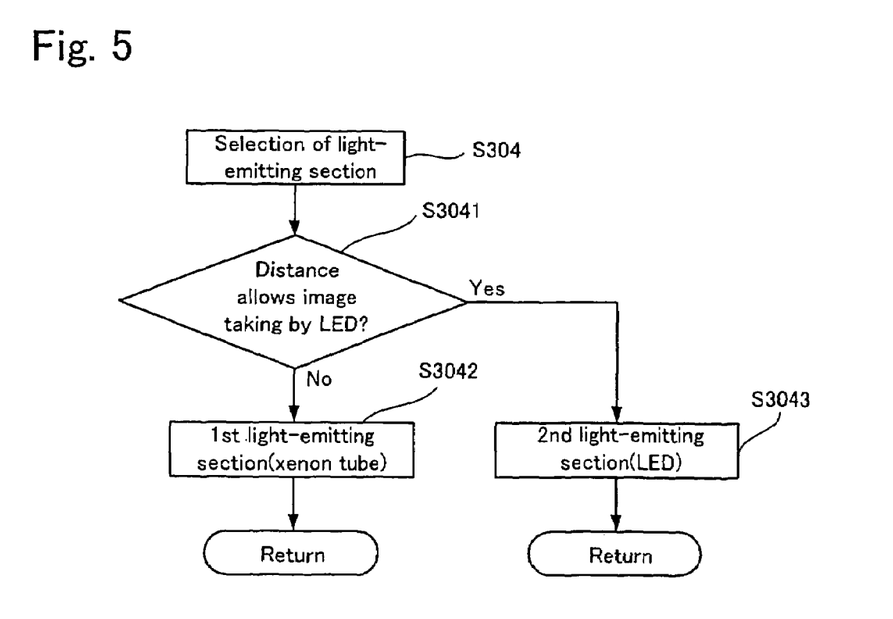
FIG. 5 is a flowchart showing a procedure of selecting a light-emitting section performed by a digital camera according to a second embodiment.

FIG. 5 is a flowchart showing a procedure of selecting a light-emitting section performed by a digital camera according to a second embodiment. The digital camera according to the second embodiment has the same structure as the first embodiment shown in FIG. 1. However, its step S304 is slightly different from that performed in the first embodiment. Note that for the digital camera of the second embodiment as well as those of other embodiments to be described later, the same components as those of the first embodiment will have the same names as those of the first embodiment although the reference characters may not be specifically mentioned.

The digital camera 100 according to the first embodiment is so configured as to emit auxiliary light from the second light-emitting section (LED) 16 without exception when an image is taken with a light emission immediately after power-on and when an image is taken with a successive light emission immediately after previous auxiliary light is emitted. However, if a distance to subject measured by TTL distance measurement at step S303 is equal to or longer than a predetermined distance, auxiliary light for image taking cannot reach the subject even when it is emitted from the LED 160*a* of the second light-emitting section 16.

In view of such circumstances, according to the second embodiment, the digital camera has been so modified as to emit auxiliary light for image taking from the second light-emitting section (LED) 16 only when a distance to subject measured by the photometric/distance measurement CPU 120 is shorter than a predetermined distance and when recharge of the main capacitor MC is not completed.

Description will be continued with reference to the flowchart shown in FIG. 5.

At step S3041, it is determined whether or not a distance allows image taking with the second light-emitting section (LED). When image taking requires auxiliary light, light is emitted from either the second light-emitting section or the first second light-emitting section depending on whether a distance to subject is short or long which is determined in comparison with a predetermined distance at step S3041.

More specifically, if it is determined that the distance is shorter than a predetermined distance (Yes) at step S3041, the flow goes to step S3043 where the second light-emitting section is selected to cause the LED to emit auxiliary light for image taking. In contrast, if it is determined that the distance is equal to or longer than the predetermined distance (No) at step S3041, the flow goes to step S3042 where the first light-emitting section is selected to cause the xenon tube to emit auxiliary light for image taking.

With this configuration, auxiliary light for image taking can be emitted from the LED emitting a relatively small amount of light when a distance to subject is short, whereas auxiliary light for image taking can be emitted from the xenon tube emitting a relatively large amount of light when a distance to subject is long.

Incidentally, the main capacitor MC may be in such a state that its recharge is not completed when the flow goes to step S3041 (No route). The second embodiment may be so configured as to inform a photographer of such an incomplete recharge in a manner similar to the first embodiment.

Figure 6:
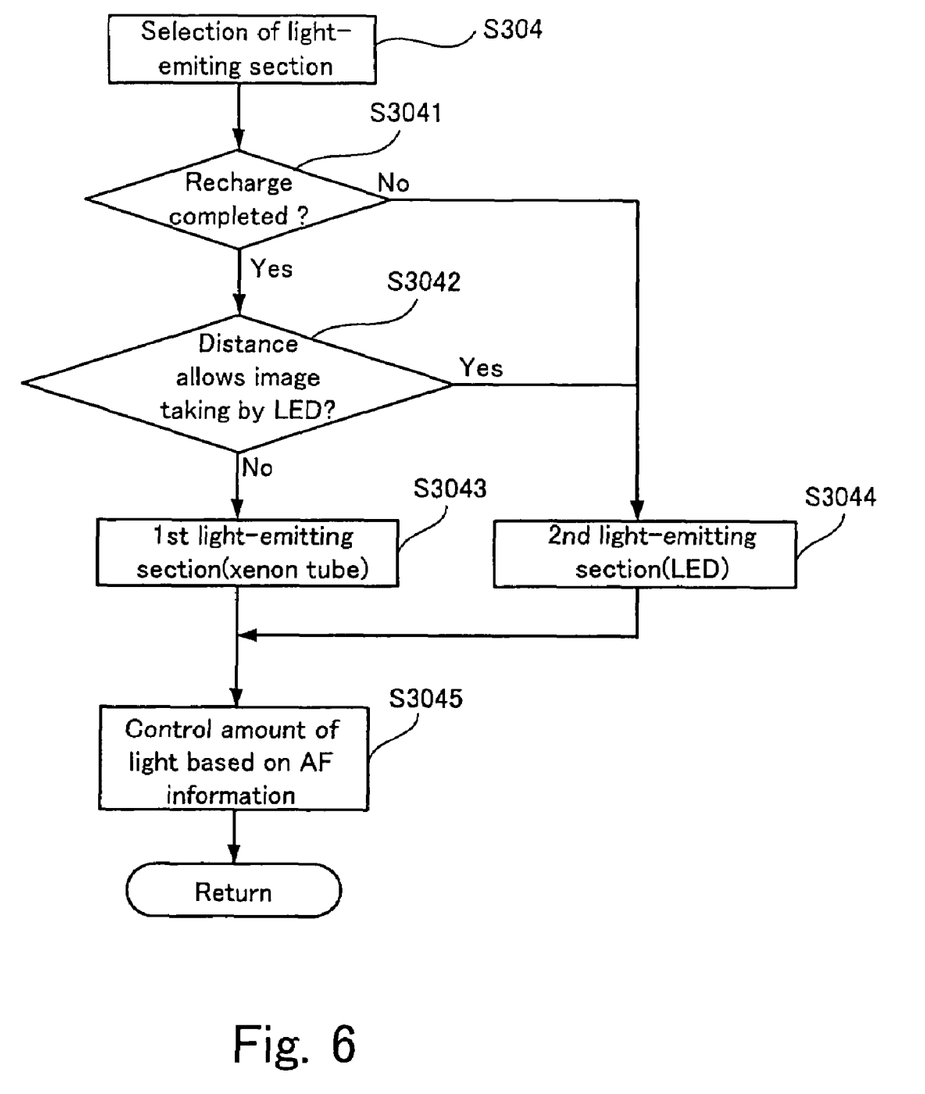
FIG. 6 is a flowchart showing a procedure of selecting a light-emitting section performed by a digital camera according to a third embodiment.

FIG. 6 is a flowchart showing a procedure of selecting a light-emitting section performed by a digital camera according to a third embodiment.

The flowchart shown in FIG. 6 is a flowchart improved by combining the selection according to a recharging condition of the main capacitor MC shown in FIG. 4 and the selection according to a measured distance value shown in FIG. 5.

If recharge of the main capacitor MC is not completed (No) at step S3041 and/or a distance to subject is shorter than a predetermined distance (Yes) at step S3042, the flow goes to step S3044 where light is emitted by the second light-emitting section. In contrast, if recharge of the main capacitor MC is completed (Yes) at step S3041 and a distance to subject is equal to or longer than the predetermined distance (No) at step S3042, the flow goes to step S3043 where light is emitted by the first light-emitting section.

Subsequently, at step S3045, an amount of light emitted from the xenon tube or the LED is adjusted based on AF information to prevent an exposure shortage or over-exposure. As a way of adjusting the amount of light, for example, an amount of light emitted from the xenon tube and the LED may be adjusted by changing the pulse width of pulse signals used as light-emission signals.

Figure 7:
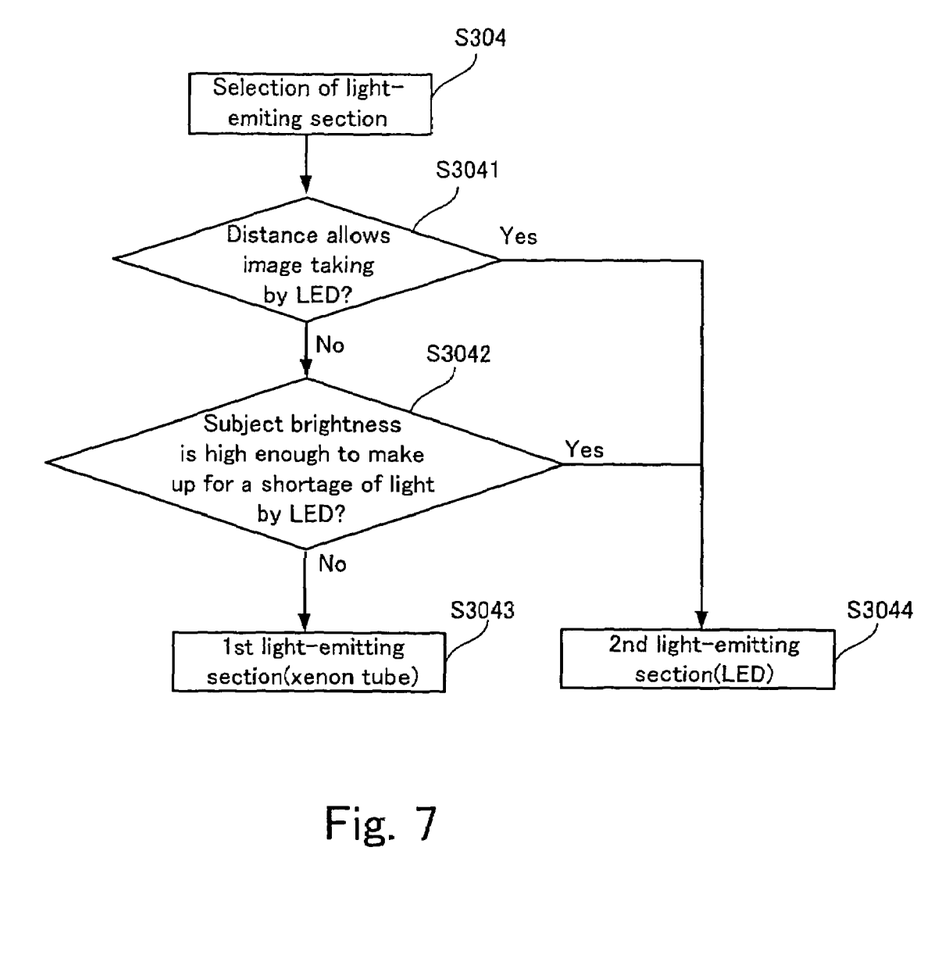
FIG. 7 is a flowchart showing a procedure of selecting a light-emitting section performed by a digital camera according to a fourth embodiment.

FIG. 7 is a flowchart showing a procedure of selecting a light-emitting section performed by a digital camera according to a fourth embodiment.

The flowchart shown in FIG. 7 is a flowchart so modified as to emit light from the second light-emitting section if exposure by the second light-emitting section is sufficient and to emit light from the first light-emitting section if exposure by the second light-emitting section is not enough when an image is taken with auxiliary light. Whether exposure by the second light-emitting section is sufficient or not is determined based on subject brightness that is a photometric value measured by TTL metering.

If it is determined that a distance allows image taking with the second light-emitting section (Yes) at step S3041, the flow goes to step S3044 where the second light-emitting section is selected to cause the LED to emit light. If it is No at step S3041, the flow goes to step S3042 where it is determined if subject brightness is high enough to make up for a shortage of light amount to be emitted from the LED. If it is Yes at step S3042, the flow goes to step S3044 where the second light-emitting section is selected to cause the LED to emit light. If it is No at step S3042, the flow goes to step S3043 where the first light-emitting section is selected to cause the xenon tube to emit light.

With this flow, it is possible to precisely control an amount of light according to distance to subject and subject brightness.

Figure 8:
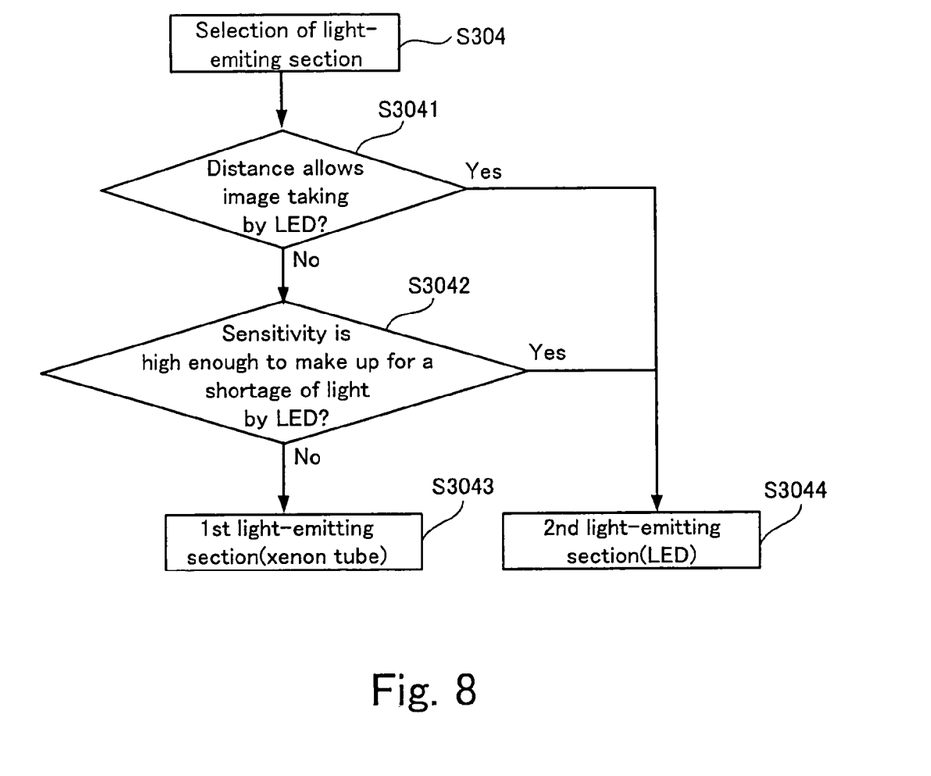
FIG. 8 is a flowchart showing a procedure of selecting a light-emitting section performed by a digital camera according to a fifth embodiment.

FIG. 8 is a flowchart showing a procedure of selecting a light-emitting section performed by a digital camera according to a fifth embodiment.

The flowchart shown in FIG. 8 is a flowchart so modified as to emit light from the second light-emitting section if exposure by the second light-emitting section is sufficient and to emit light from the first light-emitting section if exposure by the second light-emitting section is not enough when an image is taken with auxiliary light. Whether exposure by the second light-emitting section is sufficient or not is determined based on subject brightness and image-taking sensitivity.

If it is determined that a distance allows image taking with the second light-emitting section (Yes) at step S3041, the flow goes to step S3044 where the second light-emitting section is selected to cause the LED to emit light. If it is No at step S3041, the flow goes to step S3042 where it is determined if there is set a sensitivity value high enough to make up for a shortage of light amount to be emitted from the LED. If it is Yes at step S3042, the flow goes to step S3044 where the second light-emitting section is selected to cause the LED to emit light. If it is No at step S3042, the flow goes to step S3043 where the first light-emitting section is selected to cause the xenon tube to emit light.

When it is configured to emit auxiliary light for image taking selectively from the first and second light-emitting sections based on subject brightness and image-taking sensitivity in this way, auxiliary light can be emitted according to a dynamic range determined based on brightness and sensitivity, enabling image taking with appropriate exposure.

Figure 9:
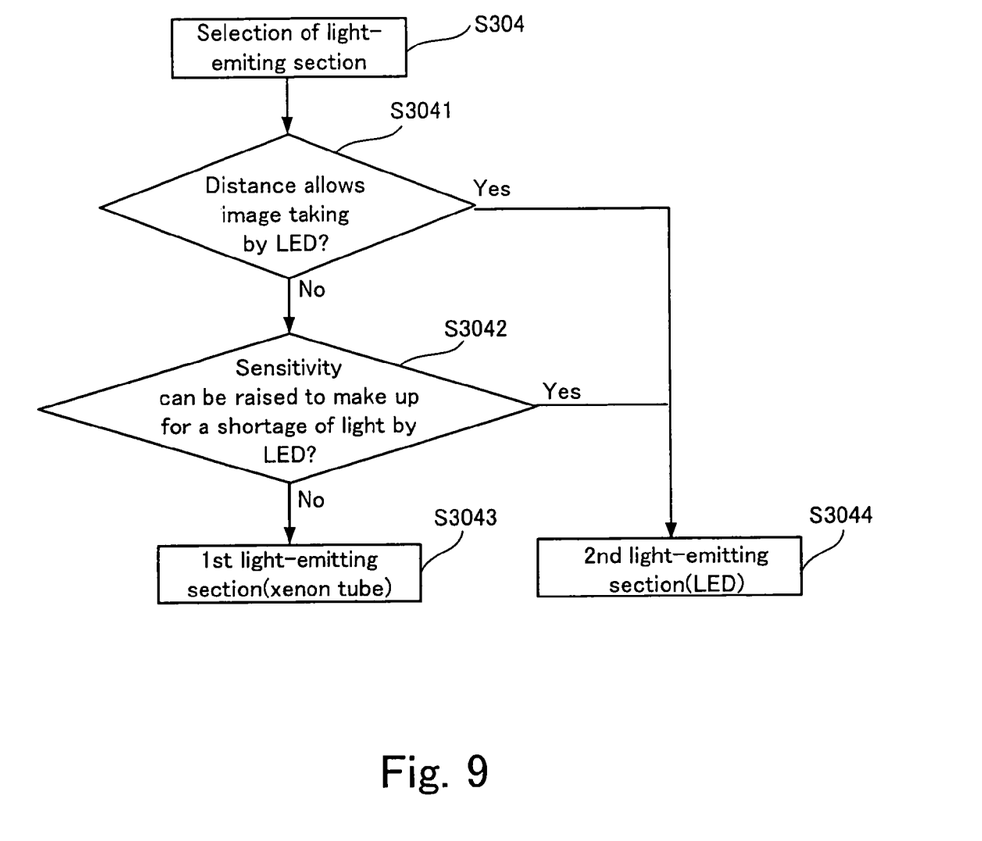
FIG. 9 is a flowchart showing a procedure of selecting a light-emitting section performed by a digital camera according to a sixth embodiment.

FIG. 9 is a flowchart showing a procedure of selecting a light-emitting section performed by a digital camera according to a sixth embodiment.

This is a flowchart where the previously-mentioned item indicating automatic sensitivity setting is selected.

In this embodiment, sensitivity is automatically set in the digital camera. Therefore, the digital camera of this embodiment has been so modified as to emit light from the second light-emitting section if exposure by the second light-emitting section is sufficient and to emit light from the first light-emitting section if exposure by the second light-emitting section is not enough when an image is taken with auxiliary light. Whether exposure by the second light-emitting section is sufficient or not is determined based on subject brightness and automatically settable sensitivity value.

At step S3041, it is determined if a distance allows image taking with the second light-emitting section. If it is Yes at step S3041, the flow goes to step S3044 where the second light-emitting section is selected to cause an LED to emit light. If it is No at step S3041, the flow goes to step S3042 where it is determined if sensitivity can be raised to a level high enough to make up for a shortage of light amount to be emitted from the LED. If it is Yes at step S3042, the flow goes to step S3044 where the second light-emitting section is selected to cause the LED to emit light and the main CPU performs processing for raising sensitivity by mixing pixels and the like. If it is No at step S3042, the flow goes to step S3043 where the first light-emitting section is selected to cause the xenon tube to emit light.

In this way, the digital camera is so configured as to emit auxiliary light for image taking from the LED of the second light-emitting section by using the function of raising sensitivity such as pixel mixing when a sufficient amount of exposure can be achieved by auxiliary light from the LED. With this configuration, power can be saved because there is no need to emit light from the xenon tube. In conventional cameras, exposure is too great when auxiliary light is emitted from a xenon tube to a close subject. However, according to the invention, it is possible to significantly reduce an over-exposure rate when a subject is at close range because auxiliary light is emitted from the LED 160*a* which is power-thrifty and whose light amount is easy to control.

What is claimed is:

1. An image-taking apparatus which generates image signals by forming a subject image on an imaging device through an image-taking optical system, the apparatus comprising:
    a first light-emitting section which has a xenon tube and a main capacitor, and accumulates charge in the main capacitor so as to emit auxiliary light to a subject when an image is taken;
    a second light-emitting section which has an LED and emits auxiliary light to a subject when an image is taken;
    a full-charge sensor which detects whether recharge of the main capacitor is completed or not; and
    a light-emission controlling section which causes the second light-emitting section to emit light when an image is taken with an auxiliary light emission in a state where recharge of the main capacitor is incomplete.

2. An image-taking apparatus which generates image signals by forming a subject image on an imaging device through an image-taking optical system, the apparatus comprising:
    a first light-emitting section which has a xenon tube and a main capacitor, and accumulates charge in the main capacitor so as to emit auxiliary light to a subject when an image is taken;
    a second light-emitting section which has an LED and emits auxiliary light to a subject when an image is taken;
    a full-charge sensor which detects whether recharge of the main capacitor is completed or not;
    a distance measuring section which measures a distance to subject; and
    a light-emission controlling section which causes the second light-emitting section to emit light when a distance to subject is shorter than a predetermined distance and recharge of the main capacitor is incomplete, and which causes the first light-emitting section to emit light when a distance to subject is equal to or longer than the predetermined distance and recharge of the main capacitor is completed, when an image is taken with an auxiliary light emission.

* * * * *